Aug. 23, 1966   E. GROEBER   3,267,948
FLUID LOGIC APPARATUS
Filed Aug. 15, 1963
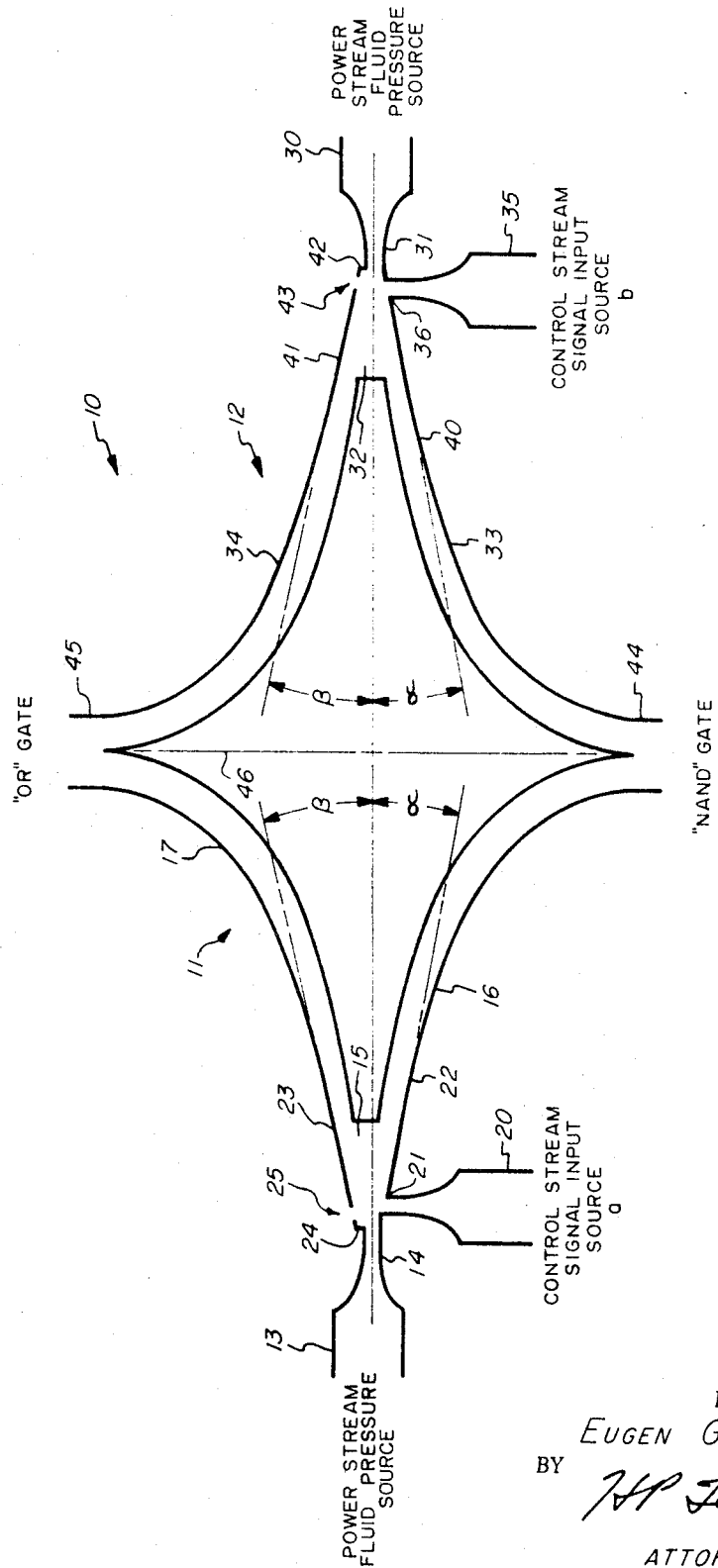
INVENTOR.
EUGEN GROEBER
BY
*H.P. Ferry*
ATTORNEY

United States Patent Office 3,267,948
Patented August 23, 1966

3,267,948
FLUID LOGIC APPARATUS
Eugen Groeber, Salt Lake City, Utah, assignor to Sperry Rand Corporation, Great Neck, N.Y., a corporation of Delaware
Filed Aug. 15, 1963, Ser. No. 302,396
2 Claims. (Cl. 137—81.5)

The present invention relates to fluid control apparatus and particularly to fluid logic devices of the type suitable for use in fluid digital computer systems. More particularly, the present invention provides a fluid logic OR-NAND device.

Prior digital computers included logic elements that were either electrically or mechanically operated. The electronic elements suffer from the disadvantages of being relatively delicate, sensitive to environmental conditions and relatively expensive while the mechanical elements include moving parts which tend to malfunction and have high inertia characteristics.

It is an object of the present invention to provide fluid logic apparatus for controlling fluid flow without utilizing moving parts.

It is another object of the present invention to provide fluid logic apparatus which produces logic functions which does not require moving parts and is not sensitive to environmental conditions.

It is a further object of the present invention to provide a simple fluid logic apparatus which produces an OR-NAND function.

The above objects are achieved by fluid logic apparatus utilizing two similar monostable elements in which each has a power stream tending to attach itself to a particular wall of the element. The pair of elements are symmetrically arranged with their output channels merging in order that the output which is favored by the power stream is the NAND gate while the opposite outlet is the OR gate.

These and other objects will become apparent by referring to the drawing which is a schematic diagram of a pure fluid logic OR-NAND device incorporating the present invention.

The pure fluid logic OR-NAND device 10 consists of a pair of similar monostable elements 11 and 12. The monostable element 11 has a power stream input channel 13 terminating at an orifice 14 in a chamber 15 formed by the intersection of first and second diverging output channels 16 and 17. The other end of the power stream input channel 13 is connected to a power stream fluid pressure source as indicated by the legend. The orifice 14 of the input channel 13 defines a path of power stream fluid flow. The element 11 also includes a control signal channel 20 terminating at an orifice 21 in the chamber 15 which defines a path of control stream fluid flow that is cooperative with the power stream.

The output channels 16 and 17 are so arranged with respect to the chamber 15 and the power stream that the power stream normally "attaches" to the outside wall 22 of the first output channel 16 and thereby tends to flow through the first output channel 16 in the absence of a control stream fluid flow. The power stream attaches to the wall 22 because of the Coanda effect which provides a stable dynamically formed and sustained pressure gradient across the power stream which keeps the power stream affixed to the wall 22. The "attachment" of the power stream to the wall 22 is sustained by the action of the power stream in entraining air into the power stream. Near the wall 22, the entrained air cannot be replaced due to the smooth, continuous adjacent surface forming the wall 22, which results in the dynamic effect of pressure reduction in the boundary layer. On the opposite side of the power stream, the outside wall 23 of the second output channel 17 is constructed so that there is no close interference of a boundary, and fluid is more freely replaced as the power stream entrains the nearby fluid. The net effect is to provide a transverse pressure gradient across the power stream which keeps the power stream flowing next to the wall 22 in the absence of a control stream and provides the element 11 with its monostable characteristic.

This effect may be enhanced by arranging the outside wall 22 to have a smaller offset than the opposite side-wall 23 or even a substantially continuous smooth surface (as shown) from the orifice 14 to the channel 16 while the outside wall 23 of the channel 17 has a larger setback 24. Further, the outside wall 23 may be vented to the ambient by an opening 25. In addition, the channel 16 may be disposed at a shallower angle $\alpha$ with respect to the power stream than the channel 17 which may be at a greater angle $\beta$. Any combination of these effects may be used to cause the power stream to flow through the output channel 16 in the absence of a control stream signal.

In a similar manner, the monostable element 12 has a power stream input channel 30 terminating at an orifice 31 in a chamber 32 formed by the intersection of first and second diverging output channels 33 and 34. The other end of the input channel 30 is connected to a power stream fluid pressure source as indicated by the legend. The element 12 further includes a control signal channel 35 terminating at an orifice 36 in the chamber 32. The power stream and control stream flows into the chamber 32 are defined by their respective orifices 31 and 36 and they are cooperative in the manner explained above with respect to the element 11.

The output channels 33 and 34 are so arranged that the power stream from the orifice 31 normally attaches to the outside wall 40 of the first output channel 33 and thereby tends to flow through the channel 33 in the absence of a control stream from the orifice 36. To enhance the attachment effect, the outside wall 41 of the channel 34 may have a setback 42 or vented opening 43 or both as previously explained with respect to the element 11. Also the channel 33 may be disposed at a shallower angle $\alpha$ with respect to the power stream than the channel 34 at the larger angle $\beta$.

The control signal channels 20 and 35 are connected to fluid control stream signal input sources $a$ and $b$ respectively as indicated by the legends. The control stream issuing from either orifice 21 or 36 may be a steady continuous stream or be pulsed for short periods of time. The control stream issues at relatively low pressure and at an angle to the power stream and causes a dual effect when it impinges upon the power stream. First, it tends to negate the Coanda effect due to the introduction of a pressure function adjacent the outside wall 22 or 40 where the power stream is attached. Second, the control stream imparts momentum to the power stream. The result is rapid deflection of the trajectory of the power stream whereby the power stream tends to flow through the second output channel 17 or 34.

To provide the "OR-NAND" gating functions, the diverging output channels 16 and 17 of the element 11 and the diverging output channels 33 and 34 of the element 12 are arranged in order that the first output channels 16 and 33 of the respective elements 11 and 12 gradually turn and asympotically merge into a common output NAND channel 44 which connects to a NAND gate indicated by the legend but not shown. Similarly, the second output channels 17 and 34 merge into a common output OR channel 45 which connects to an OR gate indicated by the legend but not shown thereby rendering the apparatus 10 symmetrical about its vertical axis 46.

In operation, in the absence of signal inputs $a$ and $b$ to the control channels 20 and 35, respectively, the power streams from the orifices 14 and 31 attach to the outside walls 22 and 40 associated with the outlet channels 16 and 33, respectively, for the reasons given above, thereby providing a NAND output signal from the NAND channel 44.

With a control signal input $a$ applied to the control channel 20, the control stream causes the power stream to flip to the channel 17 thereby providing an OR signal from the OR channel 45. Similarly, a control signal input $b$ applied to the control channel 35 causes the power stream to flip to the channel 34 thereby providing an OR output at the OR channel 45. When the control signals $a$ and $b$ are no longer applied, the power streams automatically flip back to their respective monostable states due to the Coanda effect explained above.

Depending upon which outlet is used, the OR-NAND apparatus 10 will act as an OR gate or a NAND gate in accordance with the following charts where $a$ and $b$ are the input signals indicated in the drawing and 0 indicates no input or output and 1 indicates an input or output:

| $a$ | $b$ | OR Channel | $a$ | $b$ | NAND Channel |
|---|---|---|---|---|---|
| 0 | 0 | 0 | 0 | 0 | 1 |
| 0 | 1 | 1 | 0 | 1 | 1 |
| 1 | 0 | 1 | 1 | 0 | 1 |
| 1 | 1 | 1 | 1 | 1 | 0 |

From the above charts, it will be appreciated that the OR function is provided as a 1 state signal indicating fluid flow at the OR channel 45 when either control signal $a$ or $b$ is applied and when both control signals $a$ and $b$ are applied. The NAND function which is a contraction for NOT AND is provided as a 0 state signal indicating the absence of fluid flow at the NAND channel 44 when both control signals $a$ and $b$ are applied. Thus the 1 state signals at the NAND channel 44 may be disregarded.

It will be appreciated that the apparatus of the present invention may be inexpensively manufactured of laminae with the fluid logic device 10 being stamped or cut out of an intermediate sheet of material such as metal or plastic that is sandwiched between two other sheets of similar material which form the upper and lower enclosures to define the channels, etc. Alternatively, ceramic or plastic tubing or other suitable conduits may be readily molded to form the channels, etc. to provide an inexpensive, compact and extremely reliable fluid logic element.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. A pure fluid logic device comprising:
    (a) a pair of monostable fluid logic elements,
    (b) each of said elements having an input channel for defining a path of power stream fluid flow, first and second output channels each defining a path of fluid flow, a chamber formed by the intersection of said input channel and said output channels, and a control signal channel connected to said chamber for defining a path of control stream fluid flow cooperative with said power stream fluid flow, said chamber being so constructed that power stream fluid from said input channel tends to flow through said first output channel in the absence of control stream fluid flow, while in the presence of said control stream fluid flow said power stream fluid tends to flow through said second output channel,
    (c) said first output channels of said pair of elements being directly connected to form a first common output channel,
    (d) said second output channels of said pair of elements being directly connected to form a second common output channel,
    (e) NAND gate means connected to said first common output channel for providing a NAND signal when control signals are applied simultaneously to said control signal channels, and
    (f) OR gate means connected to said second common output channel for providing an OR signal when a control signal is applied to one of said control signal channels.

2. A pure fluid logic device as recited in claim 1 in which said first output channels of said pair of elements are gradually curved to intersect to form said first common output channel and said second output channels of said pair of elements are gradually curved to intersect to form said second common output channels.

References Cited by the Examiner
UNITED STATES PATENTS

| 3,001,539 | 9/1961 | Hurvitz | 137—81.5 |
| 3,107,850 | 10/1963 | Warren et al. | 137—81.5 X |
| 3,117,593 | 1/1964 | Sowers | 137—81.5 X |
| 3,128,040 | 4/1964 | Norwood. | |
| 3,153,934 | 10/1964 | Reilly. | |
| 3,175,569 | 3/1965 | Sowers | 137—81.5 |

FOREIGN PATENTS

| 1,278,781 | 11/1961 | France. |

M. CARY NELSON, *Primary Examiner.*

S. SCOTT, *Assistant Examiner.*